3,502,737
ETHYLBENZENE DEHYDROGENATION
John R. Ghublikian, South Weymouth, Mass., assignor to The Badger Company, Inc., Cambridge, Mass., a corporation of Delaware
Continuation-in-part of application Ser. No. 586,339, Oct. 7, 1966. This application June 7, 1968, Ser. No. 735,368
Int. Cl. C07c 15/10, 5/18
U.S. Cl. 260—669      14 Claims

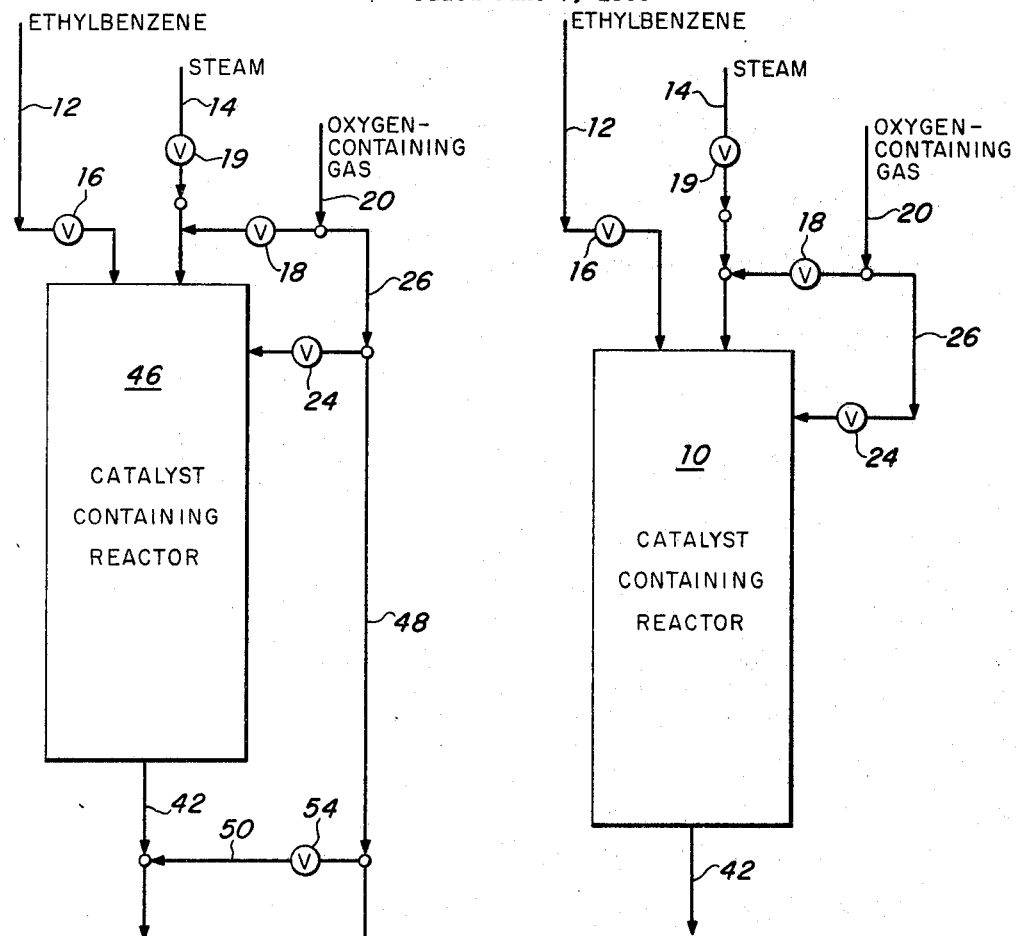
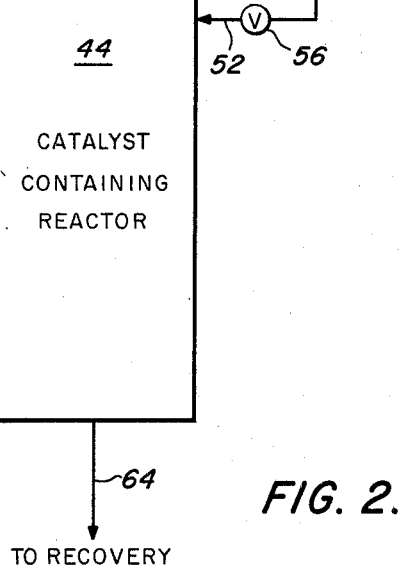
FIG. 1.
FIG. 2.
JOHN R. GHUBLIKIAN
INVENTOR.
BY
*Schuller & Pandiscio*
ATTORNEYS United States Patent Office 3,502,737
Patented Mar. 24, 1970

ABSTRACT OF THE DISCLOSURE

A process of dehydrogenating ethylbenzene involving contacting ethylbenzene, steam and an oxygen-containing gas in the presence of an iron oxide catalyst, with the amount of oxygen-containing gas being carefully controlled to maintain a selected substantially isothermal condition in the reaction zone by preferential reaction with carbon, hydrocarbon-containing material and/or hydrogen to provide heat by combustion. The amount of steam used is materially less than would be required in the absence of oxygen.

---

This invention relates to controlled dehydrogenation of ethylbenzene to produce styrene.

This application is a continuation-in-part of my copending application, Ser. No. 586,339, filed Oct. 7, 1966, and now abandoned.

The primary object of this invention is to provide an improved method of dehydrogenating ethylbenzene in the presence of an iron oxide dehydrogenation catalyst to produce styrene.

More particularly, the invention is directed to improved dehydrogenation of ethylbenzene in the presence of an iron oxide dehydrogenation catalyst by controlled introduction of an oxygen-containing gas with steam, at controlled pressures and quantity, to optimize the yield of styrene. The oxygen-containing gas, which is introduced preliminarily or interstage, and preferably both, in controlled quantity and over a dehydrogenation catalyst, effects combustion of some of the reaction components and thereby contributes heat to the dehydrogenation reaction zone. The net result of the controlled admission of the oxygen-containing gas is a reduction in the amount of steam usually required, maintenance of the dehydrogenation reaction temperature at a selected high level with a more nearly isothermal reaction zone temperature profile, improvement in the rate of conversion of ethylbenzene, and maintenance of optimum activity of the iron oxide dehydrogenation catalyst.

In the dehydrogenation of ethylbenzene to styrene, it is common practice to supply the heat necessary for the endothermic reaction by mixing large quantities of superheated steam with the hydrocarbon, in an amount sufficient to approximate a selected dehydrogenation temperature. The steam serves also as a diluent and thus favors the reaction. To maintain the temperature required by the endothermic reaction, more superheated steam may be introduced at points between the reaction stages. As the temperature increases in the dehydrogenation reaction, improved conversion of ethylbenzene to styrene results, but the improvement is attended by production of large quantities of decomposition products which adversely affect the styrene yield. At lower temperatures, there is a substantial decrease in the desired conversion. Also at lower temperatures, by-product carbon deposition fouls the catalyst surface, greatly reducing its activity. Ideally, a suitably high, essentially constant temperature yields optimum dehydrogenation results. In a single-stage dehydrogenation system, the rate of conversion of ethylbenzene to styrene is typically in the range of 30 to 50%.

Heretofore, it has been proposed in the art to introduce oxygen to an ethylbenzene dehydrogenation reaction for various purposes, notably as a heat economy to overcome some of the endothermic heat loss, to rid the catalyst of masking carbon deposits, and to burn the hydrogen produced in the reaction as well as some of the other by-products so as to shift the equilibrium in favor of styrene production. However, the concept of supplying free oxygen to the reaction chamber has also been rejected as leading to uncontrolled secondary oxiding reactions which enhance production of ethylbenzene by-products and greatly reduce styrene yield. Moreover, as pointed out in U.S. Patent 2,945,900 issued July 10, 1960 to D. S. Alexander et al. for "Catalytic Dehydrogenation of Hydrocarbons," prior attempts to increase the conversion of ethylbenzene to styrene by conducting the reaction in the presence of added oxygen using a conventional iron oxide dehydrogenation catalyst having been unsuccessful; it was found that the activity of the iron oxide catalyst was significantly reduced in comparison with operations conducted in the absence of oxygen. Accordingly the prior art has been directed to use of other catalysts as demonstrated by U.S. Patents 2,304,154, 2,945,900, and 3,371,-125 or to use of a fluidized catalyst bed from which catalyst is continuously removed, regenerated, and returned as demonstrated by U.S. Patent 3,118,007.

The present invention is based on the discovery that the conversion of ethylbenzene to sytrene using a conventional iron oxide catalyst may be improved and production of ethylbenzene by-products reduced if the dehydrogenation reaction is conducted in the presence of an oxygen-containing gas where the amount of gas is carefully controlled within predetermined limits, and moreover, that the amount of steam required to be added is materially less than would be required in the absence of oxygen. In the present invention, oxygen or an oxygen-containing gas such as air is added in a closely regulated quantity, within the range of 0.01 to 1.0 mol of oxygen per mol of ethylbenzene, calculated to maintain a selected substantially isothermal condition in the reaction zone by preferential reaction with carbon, hydrocarbon-containing material, and/or hydrogen to provide heat by combustion. This continuous, controlled, preferential combustion allows a continuous, hydrogen-containing, reducing atmosphere to be maintained over the iron oxide catalyst, whereby the catalyst is retained in a condition of great activity, free from carbon deposition, and also makes it possible to carry out the process with a relatively high rate of conversion to sytrene using as little as 4 to 10 mols of steam per mol of ethylbenzene. The oxygen and steam quantities are regulated to maintain a selected temperature and substantially isothermal reaction conditions in a temperature range of about 900 to 1350° F. as the reaction mixture passes continuously over the catalyst bed.

The selected high temperature in the range of 900 to 1350° F. is maintained while operating at a pressure below about three atmospheres, preferably about atmospheric pressure. In this connection it is to be noted that the air or oxygen is introduced to the reaction in admixture with the steam. The air and steam at an optimum temperature in the aforesaid temperature range is mixed with the ethylbenzene as it enters the reaction chamber or in the reaction chamber, and preferably additional increments of oxygen are supplied at one or more points intermediate to the rest of the catalyst bed as the reaction progresses to approximate more closely the desired isothermal condition.

The selective dehydrogenation combustion catalyst is an oxide of iron, preferably promoted by being admixed with alkali such as sodium carbonate, and activated by being heated with steam for several hours at the reaction temperature. A preferred catalyst is 2% potassium oxide-5% chromium oxide-93% ferric oxide which is distributed on an inert carrier such as magnesia and activated by heating with steam at 1100° F. for two hours. The preferred and other commercial iron oxide catalysts are available from Shell, Girdler, and others.

According to this invention, therefore, ethylbenzene dehydrogenation is effected while an oxygen-containing gas, preferably air, is supplied under close control to maintain a selected temperature to offset the endothermic cooling effect of dehydrogenation, in the range of 900 to 1350° F., in the presence of steam, at a pressure less than about three atmospheres preferably about atmospheric pressure or less. The air or oxygen is supplied preferably both with the initial reaction mixture and interstage after substantial reaction. The process may be carried out in a single or multi-stage system. In the case of a multi-stage system the oxygen may be added to only one stage or to more than one stage. In a two-stage system it is preferred that the oxygen-containing gas be added to the first and second stages in the ratio of 1:3. The term "multi-stage system" is intended to embrace two or more reactors connected in series or two or more reaction zones in a single reactor. With this process, overall conversion of ethylbenzene to styrene is typically in excess of 50% in a single-stage system and substantially higher in a multi-stage system.

The following table lists suitable, i.e. broad and preferred, operating conditions:

TABLE I.—OPERATING CONDITIONS

| | Broad | Preferred |
| --- | --- | --- |
| Temperature, °F | 900 to 1,350° | 1,100 to 1,250° |
| Steam ratio (mols/mol EB) | 4 to 30 | 5 to 10 |
| Oxygen ratio (mols/mol EB) | 0.01 to 1.0 | 0.04 to 0.32 |
| Split of oxygen supplied to two-stage plant: | | |
| First stage | Zero to all | 25% |
| Second stage | All to zero | 75% |

Suitable apparatus for carrying out the process hereof is shown diagrammatically in the drawings in which:

FIG. 1 illustrates a single-stage reactor system; and
FIG. 2 illustrates a multiple-stage reactor system.

Referring first to FIG. 1, an elongated reactor 10, enclosing a fixed bed of the preferred catalyst described above, is fed by ethylbenzene vapors entering at the upper end through a line 12 controlled by a valve 16. Simultaneously, elemental oxygen-containing gas (which may be pure oxygen but more usually is ordinary air) enters through a line 20 controlled by a valve 18, and is combined with superheated steam, at the selected temperature as stated above, which enters through a line 14 controlled by a valve 19. With this arrangement, the oxygen-containing gas is preheated to the temperature of the steam as they jointly enter the reactor. The oxygen-containing gas and the steam then pass together into the upper end of the reactor 10 in controlled quantity, commingle with the ethylbenzene upon the catalyst, and pass downward through the catalyst body. Alternately, it is obvious that the piping may be arranged so that the ethylbenzene is mixed with the steam before entering the reactor to combine with the oxygen-containing gas. In this case, the oxygen-containing gas can be passed directly and independently into the upper part of the reactor by way of a line 26 controlled by a valve 24. The preliminary quantity input of oxygen-containing gas is controlled by either valve 18 or 24. The reaction product is withdrawn continuously via a line 42 and passed to any conventional recovery system (not shown). A modified apparatus, as shown diagrammatically in FIG. 2, may be used which comprises a second stage reactor 44 mounted for series flow to receive and continue the reaction conducted in a first stage reactor 46. Reactors 44 and 46 are similar to the reactor 10 of FIG. 1, except that each of the combined reactors may be smaller for the same size operation, as needed. The reactor 46 may be operated with steam admitted through line 14 being combined with oxygen-containing gas entering through line 20, for reaction with ethylbenzene entering through line 12, as described for FIG. 1. In this case, however, the oxygen-containing gas preferably is divided and distributed to both reactors. The oxygen-containing gas is fed to reactor 44 by a line 48 connected to line 26. Line 48 connects with two lines 50 and 52 fitted with control valves 54 and 56. Line 50 connects with line 42 so that the oxygen-containing air may be admixed with the reaction product from reactor 46 before it enters reactor 44. Line 52 connects with the upper end of reactor 44 so that the oxygen-containing air may be fed directly to the catalyst bed of the second stage reactor. If desired, the oxygen-containing gas may be fed by only one of the lines 50 and 52. Whatever the distribution effected by valves 54 and 56, the amount of oxygen delivered to the second reactor is closely regulated to maintain close temperature control. The final reaction product effluent is withdrawn through line 64 and is passed to a conventional recovery system (not shown).

Although not shown, it is to be understood that the oxygen-containing gas may be introduced at two or more points along each reactor. The same also is true of the steam. It will be appreciated also that the arrangement shown in FIG. 2 affords great flexibility in distribution and very close control of the quantity of oxygen-containing gas that is admitted to the dehydrogenation reaction zone. For example, the system of FIG. 2 as shown is sufficiently flexible to effect most of the desired oxidation in the second stage, to accommodate unusual or high velocity flow patterns over the catalyst, and to compensate for the fact that when the system is first started up the unreacted ethylbenzene may pass through the reactor stages some substantial distance before much carbon or hydrogen accumulates and a need for regeneration of temperature arises. Conversely, as the dehydrogenation reaction approaches equilibrium, a smaller amount of combustion may be needed and so less oxygen may be introduced to the second reactor. The systems of FIGS. 1 and 2 are flexible to control the temperature to a very close approximation of the desired isothermal conditions.

The following tables of examples set forth several experimental runs and show the results of operating at varying conditions in a single-stage reactor using air as the source of oxygen. All of the air was admixed with the steam.

TABLE II

| | Example 1 | Example 2 | Example 3 |
| --- | --- | --- | --- |
| Run No | 27 | 35 | 42-2 |
| Run time in hours | 1.5 | 1.5 | 2.08 |
| Average inlet gas temp., °F | 928 | 922 | 932 |
| Average exit gas temp., °F | 1,140 | 1,130 | 1,178 |
| Inlet pressure, p.s.i.g | 15 | 15 | 3 |
| Steam, gm./hr | 733.0 | 640 | 489 |
| Ethylbenzene, gm./hr | 159.3 | 302 | 337 |
| Air flow, cc./min | 1,500 | 600 | 1,200 |
| Oxygen-ethylbenzene, mol ratio | 0.55:1 | 0.11:1 | 0.20:1 |
| Steam-ethylbenzene, mol ratio | 27.1:1 | 12.5:1 | 8.5:1 |
| Liquid product, gm./hr | 131.6 | 271 | 289 |
| Exit gas flow, gm. mols/hr | 4.69 | 3.63 | 5.11 |
| Liquid product analysis, wt. percent: | | | |
| Benzene | 3.18 | 1.72 | 2.55 |
| Toluene | 6.39 | 4.09 | 3.57 |
| Ethylbenzene | 15.79 | 28.8 | 27.6 |
| Styrene | 72.94 | 63.96 | 64.94 |
| m-Cyclohexane | 0.03 | 0.04 | 0.04 |
| Diethylbenzene | 0.14 | 0.11 | 0.11 |
| Exit gas analysis, mol percent: | | | |
| $CO_2$ | 13.1 | 10.9 | 9.3 |
| $O_2$ | 0.2 | 1.0 | 0.2 |
| CO | 0.3 | 1.1 | 0.1 |
| $H_2$ | 26.3 | 53.7 | 43.2 |
| $CH_4$ | 0.5 | 0.5 | 1.8 |
| $C_2H_4$ | 0.9 | 1.4 | 1.5 |
| $N_2$ | 59.0 | 31.4 | 43.9 |
| $C_2H_6$ | | | |
| Yields, mol percent: | | | |
| Styrene | 81.3 | 88.3 | 87.4 |
| Benzene | 4.8 | 3.2 | 4.5 |
| Toluene | 8.0 | 6.3 | 5.4 |
| Conversion, percent | 85.5 | 72.3 | 73.6 |

TABLE III

| | Example 4 | Example 5 | Example 6 |
|---|---|---|---|
| Run No. | 47-2 | 75 | 83 |
| Run time in hours | 2.0 | 23.55 | 6.57 |
| Average inlet gas temp., °F | 924 | 1,171 | 1,223 |
| Average exit gas temp., °F | 1,179 | 1,130 | 1,159 |
| Inlet pressure, p.s.i.g | 3 | 6.0 | 2.0 |
| Steam gm./hr | 481 | 1,089 | 1,066 |
| Ethylbenzene, gm./hr | 349 | 726 | 699 |
| Air flow, cc./min | 600 | 1,959 | 899 |
| Oxygen-ethylbenzene, mol ratio | 0.10:1 | 0.15:1 | 0.075:1 |
| Steam-ethylbenzene, mol ratio | 8.1:1 | 8.8:1 | 9.0:1 |
| Liquid product, gm./hr | 331 | 658 | 694 |
| Exit gas flow, gm. mols./hr | 3.88 | 13.2 | 5.8 |
| Liquid product analysis, wt. percent: | | | |
| Benzene | 2.06 | 2.5 | 1.8 |
| Toluene | 2.98 | 1.5 | 2.3 |
| Ethylbenzen | 29.8 | 35.0 | 44.6 |
| Styrene | 63.77 | 61.0 | 51.3 |
| m-Cyclohexane | 0.01 | | |
| Diethylbenzene | 0.09 | | |
| Exit gas analysis, mol percent: | | | |
| $CO_2$ | 8.6 | 13.4 | 8.2 |
| $O_2$ | | 0.1 | 0.2 |
| CO | | | 3.0 |
| $H_2$ | 61.2 | 43.7 | 60.1 |
| $CH_4$ | 1.9 | 2.0 | 1.8 |
| $C_2H_4$ | 1.0 | 1.0 | 0.5 |
| $N_2$ | 27.4 | 39.6 | 26.1 |
| $C_2H_6$ | Trace | 0.2 | 0.1 |
| Yields, mol percent: | | | |
| Styrene | 90.2 | 87.6 | 90.1 |
| Benzene | 3.9 | 4.8 | 4.2 |
| Toluene | 4.7 | 2.4 | 4.6 |
| Conversion, percent | 71.1 | 67.0 | 56.5 |

The six examples given are arbitrarily selected from some ninety experimental runs to show the results of variations in oxygen feed, temperature, and steam-to-hydrocarbon ratios. They illustrate a substantially high conversion ratio with sizable yields and improved economy. It will be noted in each case that although the hydrogen in the reaction products varies, in consequence of its combustion to maintain isothermal conditions at the selected temperature, substantially all of the oxygen is used up. The highest styrene yield is in Example 4 where the conversion was effected in the continued presence of a substantial amount of hydrogen.

The process also has other specific advantages. The quantity of oxygen which is introduced is controlled so as not only to offset the progressive endothermic cooling of the reaction mixture but also to avoid production of excessively high temperatures which lead to reduced yield and objectionable by-products. The result is a continuous operation with high yield—a highly economic reaction. As a factor in maintaining ideal isothermal conditions for the reaction, the oxygen causes combustion of some of the reaction components. Combustion of residual carbon removes its deposits from the catalyst and the reactor; on the other hand, combustion of some of the hydrocarbon feed has little recognizable effect on the styrene yield. Combustion of some of the hydrogen in the presence of the iron oxide catalyst produces more water, a beneficial material already present in the reaction mixture.

Since combustion of the hydrogen lowers the amount of hydrogen present in the reaction mixture, the chemical equilibrium is, in fact, shifted in favor of higher styrene yield. The selected high temperature in the said range is high enough to permit the well-known water-gas reaction to take place, promoted by the iron oxide catalyst, and thus maintain the catalyst bed free of any carbon or tar deposition; any decomposition products of the ethylbenzene are converted to small quantities of carbon dioxide and more hydrogen.

It is further noted that in prior art methods employing iron oxide catalysts where steam is the only source of heat for the dehydrogenation, a relatively large volume of steam, notably a minimum of at least 12 to 18 parts (and usually more) of steam per part of ethylbenzene, is required to ensure conversion rates of 35 to 50% and prevent catalyst fouling. The only alternate in the art for the control of reaction temperature has been the use of very expensive reactor heating equipment. With the present invention, the volume of steam required to be added to achieve conversion rates as good as or better than the rates achieved with prior methods may be as low as 4, but preferably is at least 5 to 10 parts of steam per part of ethylbenzene. Consequently, smaller and more economically constructed equipment may be used. The equipment is economical because of the smaller size required to accommodate the reduced volume of gases with good heat economy, and also because of simplicity of construction since special heating surfaces for maintaining temperature are not needed.

Various modifications will occur to those skilled in this art. Accordingly, it is understood that the examples and apparatus herein disclosed are to be regarded as illustrative and not limiting and that various modifications may be practiced without departing from the essence of the invention as defined by the claims appended hereto.

What is claimed is:

1. A process for dehydrogenating ethylbenzene to form styrene comprising bringing an ethylbenzene feedstock together with only steam and oxygen into contact with an iron oxide catalyst under dehydrogenation conditions including a temperature in the range of about 900° F. to about 1,350° F. and a pressure not exceeding about three atmospheres, said oxygen being supplied in an amount which does not exceed about 1 mol of oxygen per mol of ethylbenzene and which is less than that required to react with all of the hydrogen formed in the dehydrogenation reaction but is sufficient to maintain by combustion of some of the reaction components an approximately isothermal temperature profile in the dehydrogenation reaction zone.

2. A process according to claim 1 wherein the amount of steam is within the range of about 4 to 30 mols per mol of ethylbenzene.

3. A process according to claim 1 wherein the amount of steam is within the range of about 5 to 10 mols per mol of ethylbenzene.

4. A process according to claim 1 wherein the amount of oxygen is within the range of about 0.01 to 1.0 mol of oxygen per mol of ethylbenzene.

5. A process according to claim 1 wherein the amount of oxygen is within the range of about 0.04 to 0.32 mol of oxygen per mol of ethylbenzene.

6. A process according to claim 1 wherein at least part of the oxygen-containing gas is mixed with said steam before contacting said ethylbenzene.

7. A process according to claim 1 wherein said catalyst comprises 2% potassium oxide, 5% chromium oxide and 93% ferric oxide distributed on an inert carrier.

8. A process according to claim 1 wherein said catalyst is in the form of a fixed bed disposed in a reactor.

9. A process according to claim 8 wherein a first portion of said oxygen-containing gas is introduced into the inlet end of said reactor and a second portion of said oxygen-containing gas is introduced at an intermediate point of passage of the reaction mixture through said fixed bed.

10. A process according to claim 8 wherein said catalyst is disposed in the form of a fixed bed in two serially connected reactors, and further wherein said steam and ethylbenzene and some of said oxygen-containing gas are fed to the first in line of said reactors and the remainder of said oxygen-containing gas is fed to the second in line of said reactors.

11. A process according to claim 10 wherein the amount of oxygen-containing gas fed to the second in line of said reactors is greater than the amount thereof fed to the first in line of said reactors.

12. A process for dehydrogenating ethylbenzene to form styrene comprising introducing an ethylbenzene feed stock into one end of a dehydrogenation reactor containing an iron oxide catalyst, simultaneously introducing only steam and molecular oxygen into said reactor, said steam and oxygen also being introduced into said same end of said reactor, passing said ethylbenzene, steam and oxygen through said reactor in contact with said catalyst under dehydrogenation conditions including a temperature in the range of about 900° F. to about 1,350° F. and a pressure not exceeding about 3 atmospheres, and introducing additional oxygen to said reactor downstream of said one end, said steam being supplied to said reactor in an amount in the range of about 4 to 30 mols of steam per mol of ethylbenzene, and said oxygen being supplied to said reactor in an amount in the range of 0.01 to 1.0 mol of oxygen per mol of ethylbenzene.

13. A process for dehydrogenating ethylbenzene to form styrene comprising introducing an ethylbenzene feed stock together with only steam and molecular oxygen to a first reactor containing an iron oxide catalyst under dehydrogenation conditions including a temperature in the range of about 900° F. to about 1,350° F. and a pressure not exceeding about 3 atmospheres, and introducing the reaction effluent from said first reactor together with additional molecular oxygen to a second reactor containing an iron oxide catalyst under dehydrogenation conditions including a temperature in the range of about 900° F. to about 1,350° F. and a pressure not exceeding about 3 atmospheres, the steam being supplied to the reaction in the amount of 4 to 30 mols of steam per mol of ethylbenzene, the total amount of oxygen supplied to said first and second reactors being in the range of 0.01 to 1.0 mol of ethylbenzene and being less than that required to react with all of the hydrogen formed in the reaction but sufficient to maintain by combustion of hydrogen or other reaction components an approximately isothermal temperature profile in the dehydrogenation reaction zone.

14. Method according to claim 13 wherein the amount of oxygen supplied to said second reactor is substantially greater than the amount of oxygen supplied to said first reactor.

References Cited
UNITED STATES PATENTS

| | | | |
|---|---|---|---|
| 3,308,181 | 3/1967 | Pitzer | 260—669 X |
| 2,308,229 | 1/1943 | Natta | 260—669 |
| 3,118,006 | 1/1964 | Lovett et al. | 260—669 |
| 3,375,288 | 3/1968 | De Rosset | 260—669 |

DELBERT E. GANTZ, Primary Examiner

CURTIS R. DAVIS, Assistant Examiner